United States Patent [19]

Heinz et al.

[11] Patent Number: 4,525,840
[45] Date of Patent: Jun. 25, 1985

[54] METHOD AND APPARATUS FOR MAINTAINING WORD SYNCHRONIZATION AFTER A SYNCHRONIZING WORD DROPOUT IN REPRODUCTION OF RECORDED DIGITALLY ENCODED SIGNALS

[75] Inventors: Richard Heinz, Muehltal; Reinhard Kutzner, Darmstadt, both of Fed. Rep. of Germany

[73] Assignee: Robert Bosch GmbH, Stuttgart, Fed. Rep. of Germany

[21] Appl. No.: 447,345

[22] Filed: Dec. 6, 1982

[30] Foreign Application Priority Data

Dec. 24, 1981 [DE] Fed. Rep. of Germany ....... 3151251

[51] Int. Cl.³ .......................... G06F 11/00; H04L 7/08
[52] U.S. Cl. ..................................... 371/47; 375/114; 375/118; 360/51; 371/5
[58] Field of Search .................... 371/47, 42, 5, 40, 38; 360/51, 59; 370/114, 108; 375/114, 118

[56] References Cited
U.S. PATENT DOCUMENTS

| 3,873,920 | 3/1975 | Apple ..................................... 371/47 |
| 4,208,650 | 6/1980 | Horn ....................................... 371/47 |
| 4,275,466 | 6/1981 | Yamamoto ............................. 360/51 |
| 4,353,130 | 10/1982 | Carrasso et al. ...................... 360/51 |
| 4,357,702 | 11/1982 | Chase et al. ........................... 371/47 |
| 4,404,675 | 9/1983 | Karchevski ........................... 371/47 |
| 4,461,002 | 7/1984 | Nanko ................................... 371/47 |

Primary Examiner—Jerry Smith
Assistant Examiner—Michael R. Fleming
Attorney, Agent, or Firm—Frishauf, Holtz, Goodman & Woodward

[57] ABSTRACT

In the reproduction of digitally encoded signals, especially the time-compressed sound signals recorded along with video signals, the signals are recorded in segments interposed between sync words which are not all the same but which form a cyclical sequence. In reproduction, two or more data segments and their associated sync words are temporarily stored and correctly picked-up sync words are recognized, but when a sync word is missed, the starting address of the missing sync word is established with reference to a preceding correctly picked-up sync word by a calculating operation, whereby word synchronism is maintained for the data following the missed sync word.

10 Claims, 12 Drawing Figures

| ADDRESS | BIT COMBINATION | | |
|---|---|---|---|
| 0  | 0  0 0 0 0 0 | | |
| 1  | 0  0 0 0 0 1 | | REMAINDER OF SYNC. WORD |
| 2  | 0  0 0 0 1 0 | | |
| 3  | 0  0 0 0 1 1 | | |
| 4  | 0  0 0 1 0 0 | | |
| 5  | 0  0 0 1 0 1 | | |
| 6  | 0  0 0 1 1 0 | | |
| 7  | 0  0 0 1 1 1 | | |
| 8  | 0  0 1 0 0 0 | | |
| 9  | 0  0 1 0 0 1 | ← LSB | |
| 10 | 0  0 1 0 1 0 | ← MSB | |
| 11 | 0  0 1 0 1 1 | | FIRST DATA WORD |
| 12 | 0  0 1 1 0 0 | | |
| 13 | 0  0 1 1 0 1 | | |
| 14 | 0  0 1 1 1 0 | | |
| 15 | 0  0 1 1 1 1 | | |
| 16 | 0  1 0 0 0 0 | | |
| 17 | 0  1 0 0 0 1 | | |
| 18 | 0  1 0 0 1 0 | | |
| 19 | 0  1 0 0 1 1 | | |
| 51 | 1  1 0 0 1 1 | | |
| 50 | 1  1 0 0 1 0 | | |
| 49 | 1  1 0 0 0 1 | | |
| 48 | 1  1 0 0 0 0 | | |
| 47 | 1  0 1 1 1 1 | | |
| 46 | 1  0 1 1 1 0 | | |
| 45 | 1  0 1 1 0 1 | | |
| 44 | 1  0 1 1 0 0 | | |
| 43 | 1  0 1 0 1 1 | | |
| 42 | 1  0 1 0 1 0 | ← LSB | |
| 41 | 1  0 1 0 0 1 | ← MSB | |
| 40 | 1  0 1 0 0 0 | | PART OF 2D. DATA WORD |
| 39 | 1  0 0 1 1 1 | | |
| 38 | 1  0 0 1 1 0 | | |
| 37 | 1  0 0 1 0 1 | | |
| 36 | 1  0 0 1 0 0 | | |
| 35 | 1  0 0 0 1 1 | | |
| 34 | 1  0 0 0 1 0 | | |
| 33 | 1  0 0 0 0 1 | | |
| 32 | 1  0 0 0 0 0 | | |

FIG. 6

METHOD AND APPARATUS FOR MAINTAINING WORD SYNCHRONIZATION AFTER A SYNCHRONIZING WORD DROPOUT IN REPRODUCTION OF RECORDED DIGITALLY ENCODED SIGNALS

This invention concerns the reproduction of recorded digitally encoded signals, particularly television signals, which are recorded in data segments interposed between words of a succession of synchronizing words that are not all the same, but follow a particular sequence. More particularly, the invention concerns maintaining word synchronization in signal reproduction following a signal dropout that causes a synchronizing word to be lost.

In the reproduction of magnetically recorded data, it is necessary to take account of the occurrence of errors as the result of incomplete contact with the tape or irregularities in the tape surface. If the data in question represent color television information, the usual frequency modulation leads to consequent amplitude discontinuities in the envelope curve of the picked-up signals after demodulation, which in turn lead to picture disturbances in the form of longer or shorter, brighter or darker, television line segments. The sound signals recorded on the relatively broad longitudinal tracks of the magnetic tape are in general free of sporadically occurring serious disturbances.

When the color television signals are recorded as digitally coded data on the magnetic tape, it has been found practical to record the sound signals also in digitally coded form. In that manner, the same magnetic heads that handle the video signals can be used for recording and reproduction of sound signals. The recently developed semiconductor signal stores make possible sound recording in time-compressed form in blocks at the beginning or at the end of a track which contains the video information. Usually a synchronizing word is placed at the beginning of the signal block containing sound information (sound burst) which makes possible the recognition of the sound information and its subsequent decoding. If this synchronizing word is lost, all the following sound information will be decoded falsely or not at all. It is already known that the effects of such a failure can be reduced by subdividing the information block further and putting an individual synchronizing word in front of each subdivision. The length of the resulting disturbance is thereby indeed reduced, but since the human ear is particularly sensitive for sudden loudness changes, however, even the residual sporadic miscoding allowed by the above-described remedy is intolerable.

A frequently used kind of digital encoding of originally analog signals is pulse code modulation (PCM). In PCM each momentary value obtained by the "sampling" of a signal is represented by a digital word which consists of a characteristic sequence of binarily representable individual conditions (bits). In the reproduction of signals encoded in the manner, it is necessary to determine the place value of the individual bits. For this purpose, synchronizing words (sync words) are inserted into the data stream at relatively short intervals.

The effect of the above-described errors caused by fluctuations in the spacing between the magnetic tape and the magnetic transducer or structural imperfections of the tape itself in the case of PCM recording are such that parts of the reproduced signals are falsified or that these parts are not reproducible at all, because the synchronization has been lost. Such a synchronization loss occurs, for example, if a signal dropout at the beginning of an information period garbles the sync word. The information following this sync word cannot then be read out correctly because it is not known just when a digital word begins or when a bit must be accorded a particular place value in decoding. The errors produced by missing word synchronism in the reproduced signal cannot retroactively be corrected if the correction is dependent upon recognition of the sync word. In such a case, only the information that follows an intact sync word is further processed. That means that the information following a garbled sync word is lost and that the effect of small dropouts and bit errors in the sync words is quite noticeably coarsened. The consequences of such faults could heretofore be mitigated only to the extent that, as already described above, a larger number of sync words can be introduced into the information. This type of improvement is quite expensive, however, and leads to a poor utilization of the information capacity of the channel. Raising the number of sycn words, furthermore, does not avoid the effect of bit errors in the sync words, but only the duration of the effect. It is of course possible in principle to recognize errors in sync words by error checking methods, followed by their correction. These methods are quite expensive, however, and only possible by the insertion of supplemental check bits in the signal stream. That brings about a further loading of the channel capacity. In addition, there arises a further problem because of the time delay that is introduced in the processing of the information stream for error checking and correction prior to decoding.

SUMMARY OF THE INVENTION

It is an object of the present invention to make possible the retrieval of the information following a dropped-out or garbled sync word without the necessity of redundant recording of the information to assure its correct decoding.

Briefly, all the information of a data segment is temporarily stored, and the original ordering relation of the information to the synchronizing words is re-established by calculating back to the beginning address of the dropped-out synchronizing word and correction of the bit positions by reference to at least one of the sync words following the end of the data segment. This is advantageously combined with the commonly provided step of smoothing out digital timing errors by storing digital signals and then reading them out with quartz-timed pulses, which also requires temporarily storing data segments.

The advantage is thereby obtained that, if at least one of several sync words in an information block comes through correctly, or without any uncorrectable bit errors, word synchronism is no longer lost. There is the further advantage that a high margin against error can be obtained in the PCM recording of signals. The expense for protection of the sync words against error can thus be kept small, because the utilization of the channel is not reduced by redundant recording. Finally, the invention is of broad applicability, because there is reason for its use wherever digital information is recorded on an information carrier and reproduced therefrom, or when digital information is transmitted over channels subject to strong disturbances.

Further features of the invention are described in the detailed description set forth below.

BRIEF DESCRIPTION OF THE DRAWINGS

The invention is further described by way of illustrative example with reference to the annexed drawings, in which:

FIG. 6 is a data table for illustration of the address organization of data about to be recorded;

DESCRIPTION OF THE ILLUSTRATED EMBODIMENTS

Figure 1:
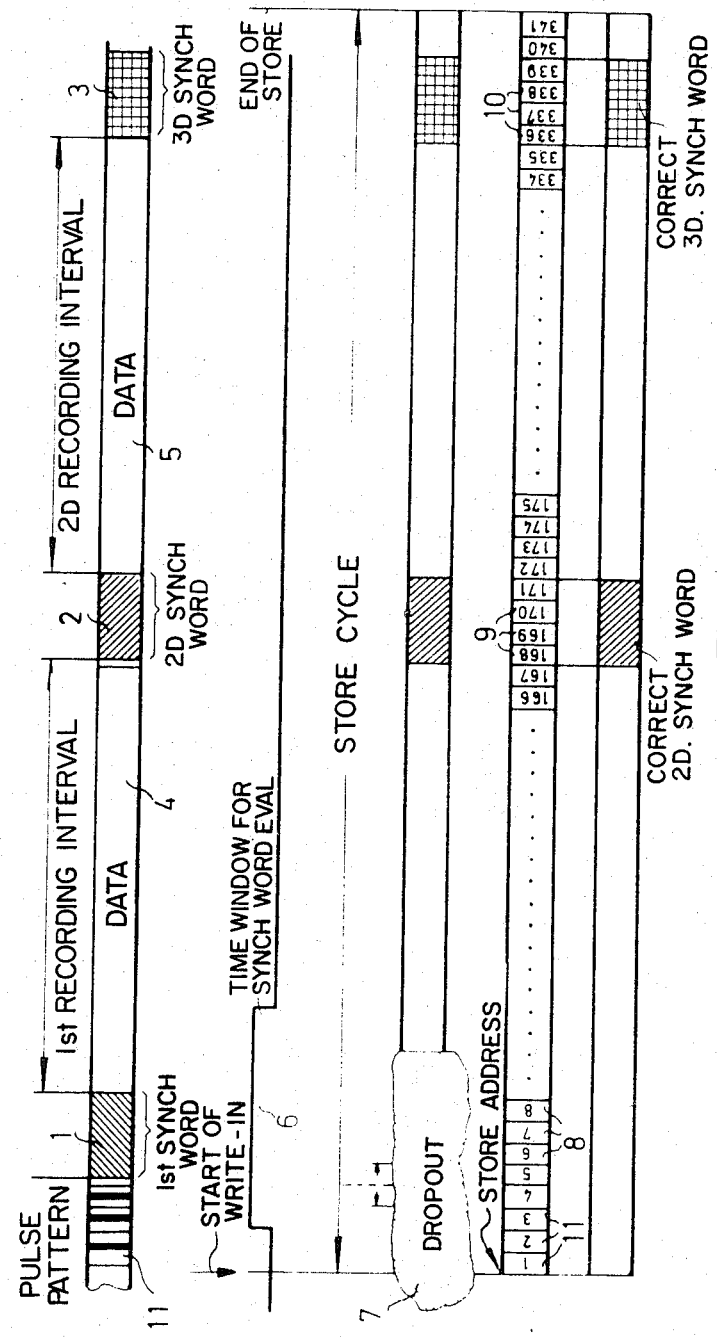
FIG. 1a is a diagram of a portion of a recording track on a tape containing two data segments and three sync words.
FIG. 1b is a diagram of the pickup of signals from the track portion of FIG. 1a according to the invention during one temporary store cycle.

The embodiments illustrated andd now described relate to pickup of sound recorded in digital form in video recorder-reproducers using magnetic tape. The method and apparatus involved, however, is also applicable to the pickup of recorded video signals, although there as a result of the inherent redundance of the television signal, there is always the possibility to utilize the information of a previous television line in place of a disturbed line.

As the result of the fluctuations occuring during pickup because of the limitations of the technology, timing errors occur in the signals reproduced from the tape. These are eliminated by the storing of an entire block of signals and then reading out the stored signals in strict time synchronism. This process thus provides correction of the time base.

In the reading out of a "signal burst" (signal block) from the magnetic tape, errors occur, such as dropouts, bit errors, etc. The sync word can be garbled or lost by such errors, with the resulting loss of word synchronism. This means that the value of the various bit cells is falsified because the bits appear in shifted places. The consequence of such a disturbance is the loss of the entire information until an intact sync word is read out.

The present invention provides a way that makes it possible to read and evaluate the undisturbed information that follows a garbled or missing sync word. In order to accomplish this, the entire information block just as it comes from the tape is first put into a store that has a capacity somewhat greater than the information quantity itself.

FIG. 1a shows a section of a track containing recorded data segments where the data segments 4 and 5 are bracketed by three sync words 1, 2 and 3 that are different from each other. According to a particular embodiments, the data segments 4 and 5 may, for example, be two successive sub-divisions carrying the content of a sound bursh contained on a recording track.

FIG. 1b, on the top line thereof, shows a time window 6 provided for sync word evaluation, this window being "open" by suitable electronic operations for a period within which the duration of the expected sync word falls. On the basis of the prescribed recording pattern, there is a fixed relation between the H and V reference pulses, or digital words of a running video recording, and/or the recognition words or sync words of completed data recordings, and, on the other hand, the necessary time-gating (of the time window). E.g. Each sync word may have its own "time-window" for evaluation of sync?

The time-gate is therefore continuously synchronized with the time-position of information on the tape. Finally, an independent quartz-stabilized clock frequency is used for reading out the information of the tape store by means of the electronic circuitry to be described. The time-base fluctuations of the dynamic recording medium are thereby eliminated in the reading out of the information. In the case of a disturbance 7 (FIG. 1b), coutents of Store 18 & 19 (FIG. 2) of the addresses 8 belonging to the obliterated sync word in question are not readable. As shown in FIG. 1b, in the middle of the three bottom stripes thereof, in this example, the storage space for one store cycle is subdivided into 341 addresses, and certain groups of them are designated by the reference numerals 8, 9, 10 and 11. Without utilization of the method of the invention, the entire amount of information following the obliterated sync word 1, down to the beginning of the addresses 9 of the next sync word in sequence, would be lost. The address packet for the third sync word is shown by the reference numeral 10. At the beginning of every sound section recorded in digitally encoded form, a clocking pattern 11 is present, which facilitates synchronization of the signal reproduction circuits. Number of Bit cells and number of sync-words can be different to this example?

Figure 2:
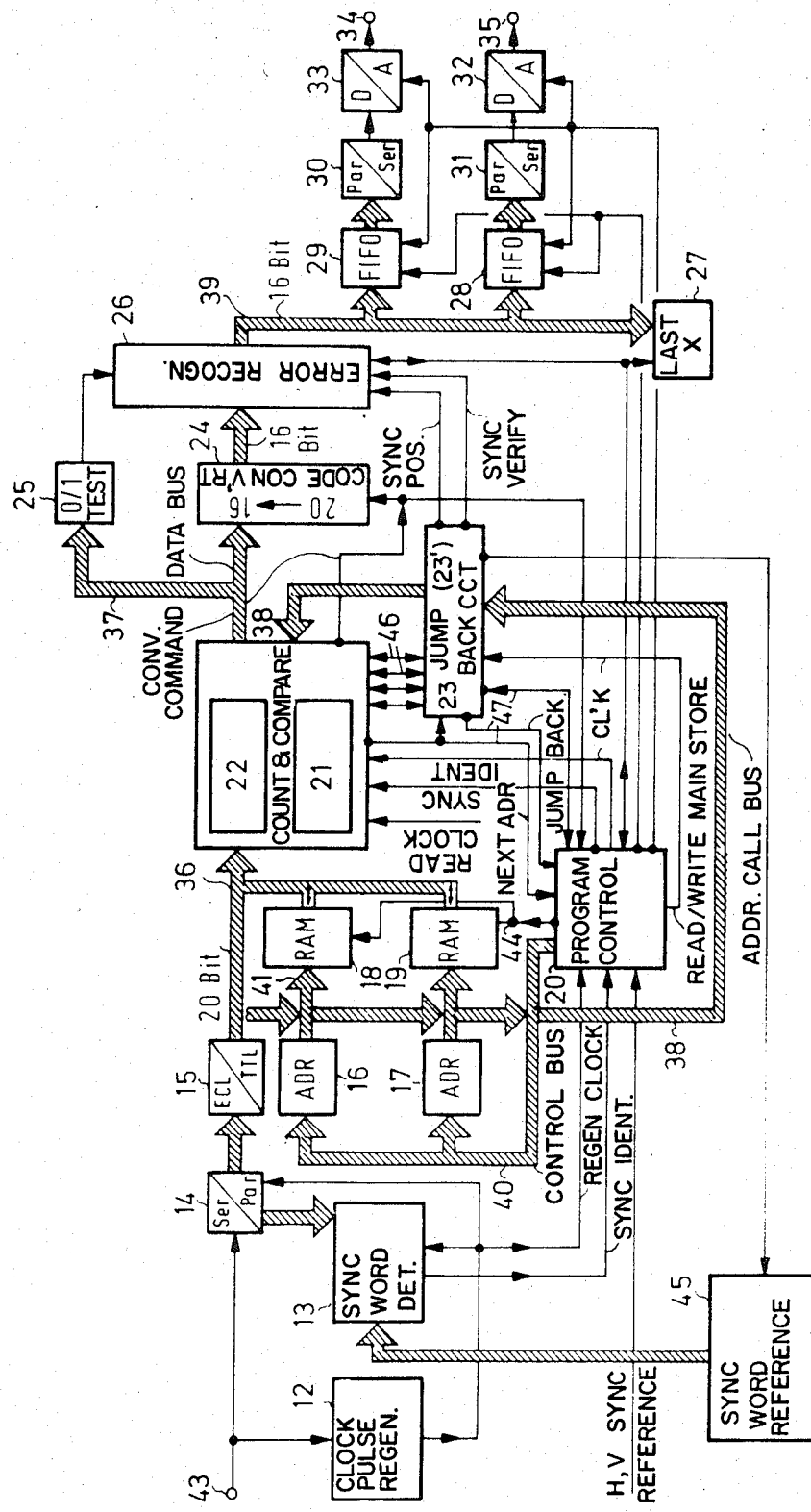
FIG. 2 is a circuit block diagram of the overall organization of a signal reproducing system embodying the invention, showing only the portion that follows the circuits including, and more immediately following, the pickup heads.

Time-gate circuits are utilized for evaluation of the sync words in order to make this evaluation more secure against disturbing influences. For simplicity of illustration, only the time-gate for the first sync word 1 is shown, namely the one corresponding tto the time window 6. When a sync word 1 is detected during this time window 6, it will be accepted by the program control circuit 20 (FIG. 2); otherwise, it will be missed. The process of writing into the stores 18 and 19 of FIG. 2 is started by the program control circuit 20 at a moment at which the data signals picked up from the tape are imminently expected.

The position and the moment which corresponds exactly to the moment and position of the sound recording on the magnetic tape can readily be determined from the angular position of the headwheel of the recorder-reproducer and from additional information recorded on the tape (on a control track). If, as already recommended above, the video region is scanned before the audio region, the start signal for the control of the stores 18 and 19 of FIG. 2 can readily be derived without great expense, for example with simple TTL logic components (74 LS series, and C-MOS components can likewise be used) out of the already present synchronizing and switching signals for magnetic head switchover.

The information block put into the temporary store, of which one cycle is described in FIG. 1b, is provided with three sync words: one at the beginning, one between the first recording interval and the second recording interval, and one at the end. Whenever a sync word is announced during writing into the main store as the result of recognition by the sync detector 13, the store 51 (FIG. 3) stores the address of the sync word. The addresses are illustrated in FIG. 1b which represents one cycle of storing in the main stores 18 and 19 of FIG. 2, defining exact locations in the stores. In order that after the loading of the information block into the main stores 18 and 19, this information may be read out again with correct timing, a rearward jump to the beginning address of the sync word 1 at the beginning of the information must be performed. The data for jumpback are determined by a code word (number of words according to the recording interval), which can also be recorded on the tape, if required in some particular embodiment. The code word is defined, in dependence on the number of information words which are contained in one block, by how many count pulses the address counter of the main store must be set back until it has reached the address of a particular sync word. Since this address was stored in the store 51, the address comparison then indicates a "correct" address. It is now made sure that word synchronism is maintained by virtue of the evaluated word. A supplementary check can be provided by which a data word read out of the store is evaluated.

It is essential for the exact performance of the rearward jump that the address with which jumpback begins is always the address of an unspoiled sync word. For this reason, the address counter 59 (FIG. 3) is controlled in several phases by the jumpback circuit 23 and the program control circuit 20. First the address of an intact sync word is loaded (e.g. sync word 3 or 2 in FIG. 1). It is determined in this operation which sync word will be read Then counting back is done to the address of sync word 1. If the information is error-free, the sync word can be verified. If not, the reading of the information must proceed "blind". It is determined in the reading of the information whether the data are error-free. So long as additional errors such as individual bit errors are not contained in the signal, a part of the first interval can also now be read at this time, even when, as shown in FIG. 1, the sync word 1 has been lost by a drop-out. It is possible to maintain protection against error even when 1 or 2 sync words are spoiled or obliterated. Since it makes no difference which of these sync words is missed, one of the important problems of PCM recording is hereby solved, namely protection against loss of word synchronism.

FIG. 2 shows a circuit block diagram that makes clear the principal application of the method. For clarification of the representation only two data channels are shown here. The electronic circuitry for sync word protection is interposed between the RAM stores (random access memories) 18 and 19 and the 20/16-bit code converter 24.

Controls for the stores must now be so designed that they can follow the commands of the jump-back circuit 23. Such a control is provided by changes in the program control 20. The other functions of the program control circuit 20 are maintained unchanged, however, compared to conventional circuits: control of clocking of the digital-to-analog converters, of first-in-first-out (FIFO) stores, parallel-to-serial converters, error recognition and "last X" error correction. Since the function of the error correction circuits have already been exhaustively described in a prior patent application of the present assignee, Ser. No. 286,693, filed on July 28, 1981, all that is not necessary for our understanding of the present invention is left out in the drawings and description of this application.

FIG. 2 shows an input 43 that is connected to the output of a de-emphasis-preamplifier for the magnetic pickup heads. The input terminal 43 is connected with a timing pulse regenerator 12 and to a serial-to-parallel converter 14. The serial-to-parallel converter supplies its parallel output signals to the sync word detector 13 which makes a bit-for-bit comparison with the output of the sync word reference source 45.

The clock-pulse regenerator 12 supplies its bit-synchronous pulses to the serial-to-parallel converter 14, the outputs of which are connected to the ECL/TTL converter 15.

Because of the high data rate, the clock-pulse regenerator, sync word detector and serial-to-parallel converter are equipped in the illustrated example with ECL components (emitter coupled logic). The output signal of the sync word detector 13 is supplied to the program control circuit 20 which evaluates the "sync-ident" signal with reference to the time window 6 shown in FIG. 1b. This occurs by means of a simple AND-gate. The evaluated "sync-ident" serves to register the recognized sync word with reference to its position in the store 18 or 19. For the case illustrated in FIG. 1 the addresses of the intact sync words 2 and 3 are designated with the reference numerals 9 and 10 and represent the addresses 168 to 171 and 336 to 339 registered in the sync address store 51.

The program control circuit 20 supplies the necessary signals to the address registers 16 and 17 over the control bus 40 for performing the jump-back to the beginning address. Before the writing in of the data block read out of the magnetic tape into the store 18 or 19, the address registers 16 and 17 are reset to the beginning address 00. When the jump-back is performed, the calculated beginning address can be directly loaded into the address register (utilizing the parallel-loading inputs of the counter components which constitute the registers).

There are several methods of providing the initial address. One possibility is to carry this out by means of a microprocessor or a computer unit. It is a question in this case of subtraction performed with two digital words. One of them is the address of the sync word that has been read and the other is a code word that states how many sample values are present in one interval. The code word can also be a data word out of the information read from the tape, but it can also be a specific number (166,167 . . . ) dependent upon the internal rhythm of the machine. There are still other possibilities, such as e.g. the backwards counting of the counter or the use of a table in the form of a PROM.

The program control circuit 20 controls, along with the address registers 16 and 17, also the read/write control inputs of the main stores 18 and 19, which is done over the control bus 44. The input-output connections of these main stores are connected to the 20-bit bus to which the output of the ECL-TTL level converter is connected. This 20-bit bus 36 is a data bus that connects to the input of the sync word protection circuits 21, 22 which can be described as counting and comparison circuits. The address registers 16 and 17 provide the addresses to the RAMs 18 and 19 by the respective address bus portions 41 and 42. This address bus 41,42 is repeatedly tapped or interrogated by the address interrogation bus 38. The bus 38 supplies the signals to the sync word protection circuit 21 which are then in a position to check by a comparison performed with the assistance of the jump-back circuit 23, whether the correct addresses are present in the main stores 18 and 19.

The electronic circuitry for the sync word protection circuits 21,22 consists of two independent units, one for each channel. In the system illustrated in FIG. 2 a two-channel version is shown, with twin address registers 16 and 17 and twin RAMs 18 and 19, for instance, so that two counting and comparison circuits 21,22 are provided for sync word protection. These operate in alternation in time-sharing operation. The output signals of the main stores 18 and 19 are called into the two sync word protection units 21 and 22 by the command "next address" provided by the program control 20. The output signals of the circuits 21 and 22 are supplied over a common data bus 37 to the 0/1-test circuit unit 25 and the 20 to 16 bit converter 24, both of which are more fully described in the aforesaid copending application serial number 287,693 The output signals of the 20/16 converter 24 and of the 0/1-test unit 25 are supplied to error correction electronic circuit. The latter circuits also receive two more signals from the jump-back circuit 23: the "sync position" signal, that indicates the correct position of the sync word and the "sync-verifying" signal that indicates that the sync word or words has or has been received without error. At this point, several possibilities are available for selection. It can be decided whether one or more sync words ought to be present, or whether the presence of only one sync word is sufficient. The same holds for the number of different sync words used in the process. This number is freely selectable in the design of the system, and likewise the kind and manner of sync word constitution. Each sync word can, for example, be produced by breaking a particular coding rule, but it can also be a word which is distinguishable from the data words.

The error correction circuit 26 also receives a signal from the program control circuit 20 that determines what kind of error correction or error masking should be used. This signal is supplied over the control line 47 and is also supplied to the "last X" register 27 which stores the last digital value recognized as correct. In this register 27 separate storage is provided for the two channels. Finally, the FIFO stores 28 and 29 are connected to the output data bus 39 of the error recognition circuits 26. The last-mentioned stores in turn provide outputs respectively to the parallel-to-serial converters 30 and 31 which then supply serial signals respectively to the digital-to-analog converters 32 and 33 at the respective outputs 34 and 35 of which the analog signals of the two channels are finally present.

The program control circuit 20 supplies the necessary clocking to the first-in-first-out stores 28 and 29, the parallel-to-series converter 30 and 31, and the digital-to-analog converters 32 and 33. For simplification of the illustration, this provision of clock pulses is greatly simplified by merely showing two lines. The same holds for the supply of clock and identification signals to the sync word protection units 21 and 22. Here the lines for resetting of counters are omitted. The control lines designated 47 are shown as busses in the further figures of the drawings.

Figure 3:
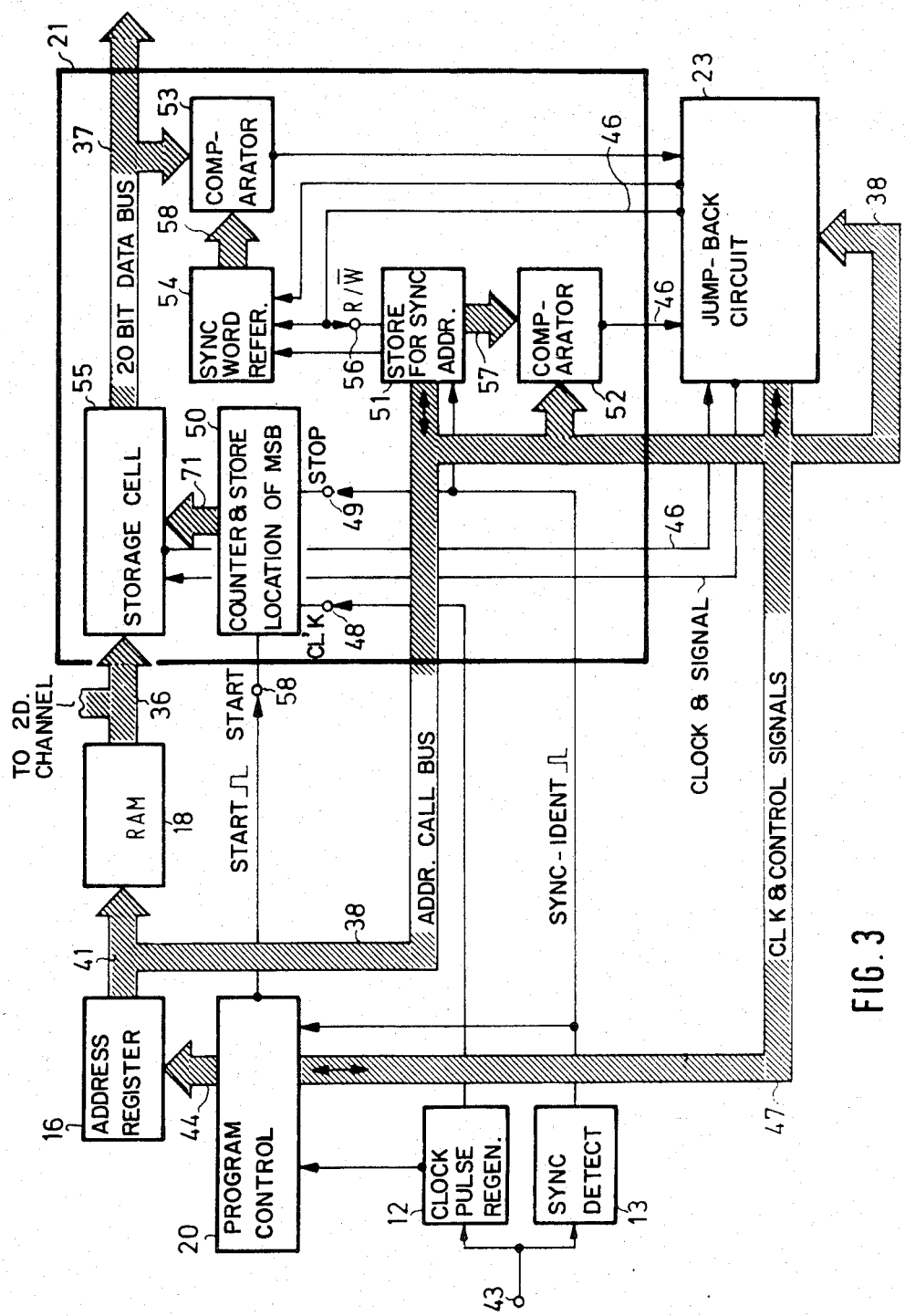
FIG. 3 is a circuit block diagram of the counting and comparing circuit 21 of FIG. 1, together with certain elements of FIG. 1 closely associated therewith.
Figure 4:
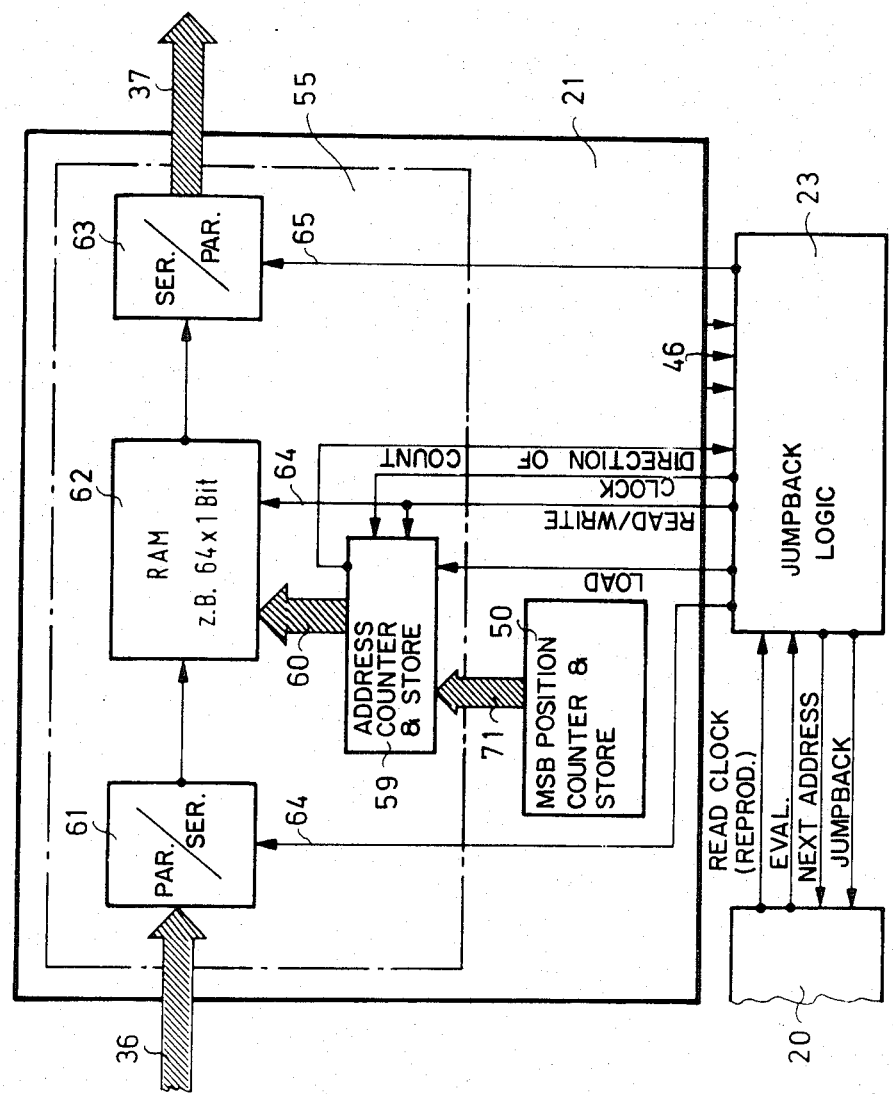
FIG. 4 is a circuit block diagram showing the circuit of the storage cell 55 of FIG. 3 in a form utilizing a random access memory.
Figure 5:
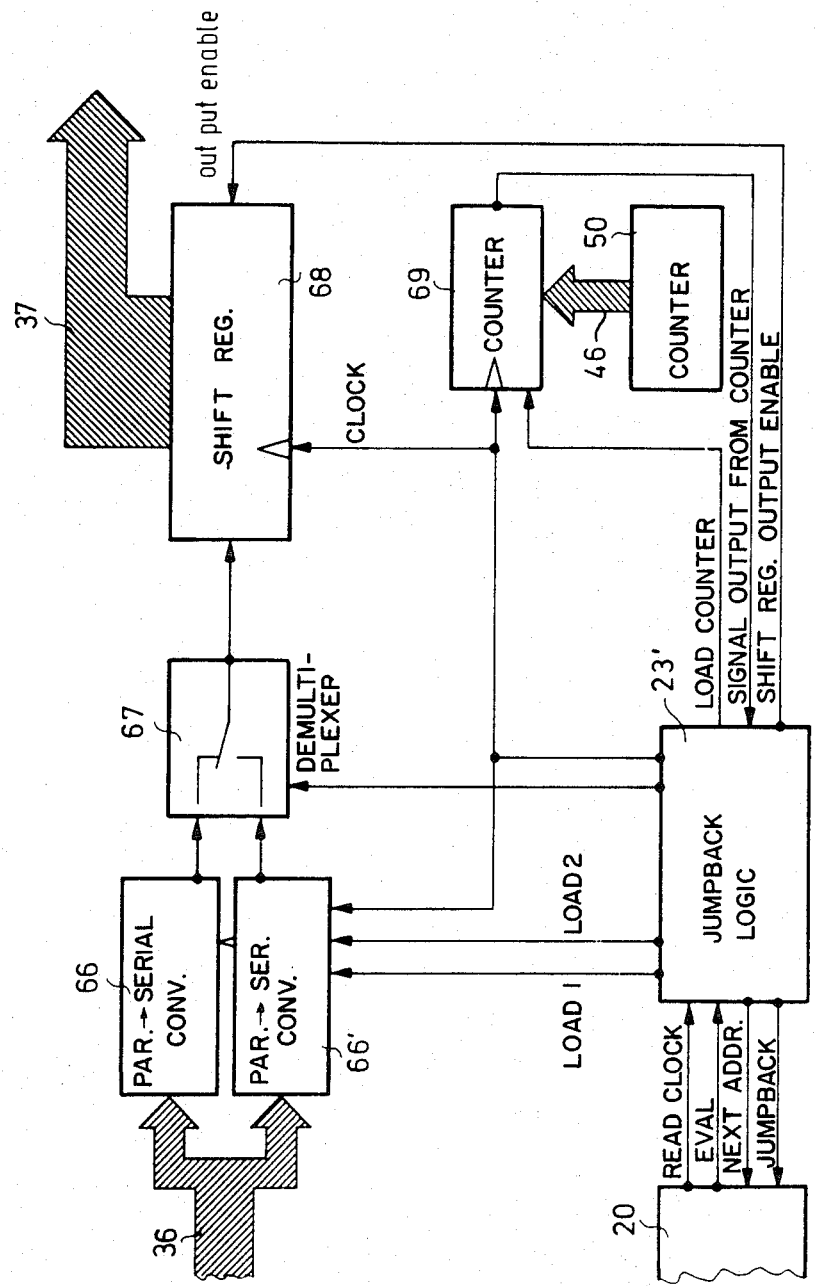
FIG. 5 is a circuit block diagram showing the circuit of the storage cell 55 of FIG. 3 in a form utilizing a shift register.

Further details of the counting and comparison circuits 21 and 22 are illustrated for the circuit 21 in FIG. 3. The data arriving from the main store 18 are supplied over the bus 36 to a storage cell 55, the constitution of which is shown in detail in FIGS. 4 and 5 and explained in this connection. The circuits according to FIGS. 4 and 5 respectively show different illustrative embodiments. The storage cell 55 is controlled over a bus 71 by the outputs of the counting and storage circuit 50. The latter receives clock, start and stop signals respectively from the program control circuit 20, the clock-pulse regenerator circuit 12 and the sync word detector 13. As already mentioned, the program control 20 provides the start signal at the moment in which reproduction signals from the tape are imminently expected on the basis of knowledge of the momentary angular position of the headwheel in the illustrated case.

The counter of the counting and storage circuit 50 begins to count at the bit clock rate of the incoming information and is stopped in the moment at which a sync word is positively identified. The counter of the circuit 50 then indicates the position of the most significant bit (MSB) within the stored words in the main store. At the same time the main store cycle is started by the counter of the circuit 50. The data words read from the magnetic tape are written into the store 18 without regard to the position of the MSB (for illustration reasons, only the components of one channel are shown in FIG. 3; they are repeated in every additional channel). Since now one data word must be reconstituted out of two words which have been put in adjacently lying address places in the store 18, after the jumpback to the beginning address, the electronic circuitry 55, illustrated in FIG. 4 or FIG. 5, now comes into action. First, however, the backwards jump to a beginning address is initiated by the jumpback circuit 23. The circuit 23 can contain calculating circuitry that produces the address of the first data word in the first information interval 4 of FIG. 1 with the assistance of the sync word addresses stored in the store 51 which are delivered over the address interogation bus 38 to the jumpback circuit 23. The error recognition circuit 26 (FIG. 2) decides regarding the correctness of the data now read out of the main store. It is also possible after the end of writing in the data from the tape to check the correctness of the individual sync words. For that purpose, the sync word reference source 54 shown in FIG. 3 turns on the comparator 53 over a bus 58, and the comparator 53 then compares the data word on the data bus 37 with the content of the reference source 54. The sync word reference source 54 is informed from the jumpback circuit 23 by control signal connections 46 which of the three different sync words is expected. The store 51 and the storage cell 55, like the reference source 54, are controlled and interrogated over connections 46 by the jumpback circuit 23, which takes over these control tasks alongside the performance of the address jumpback operation.

Figure 7:
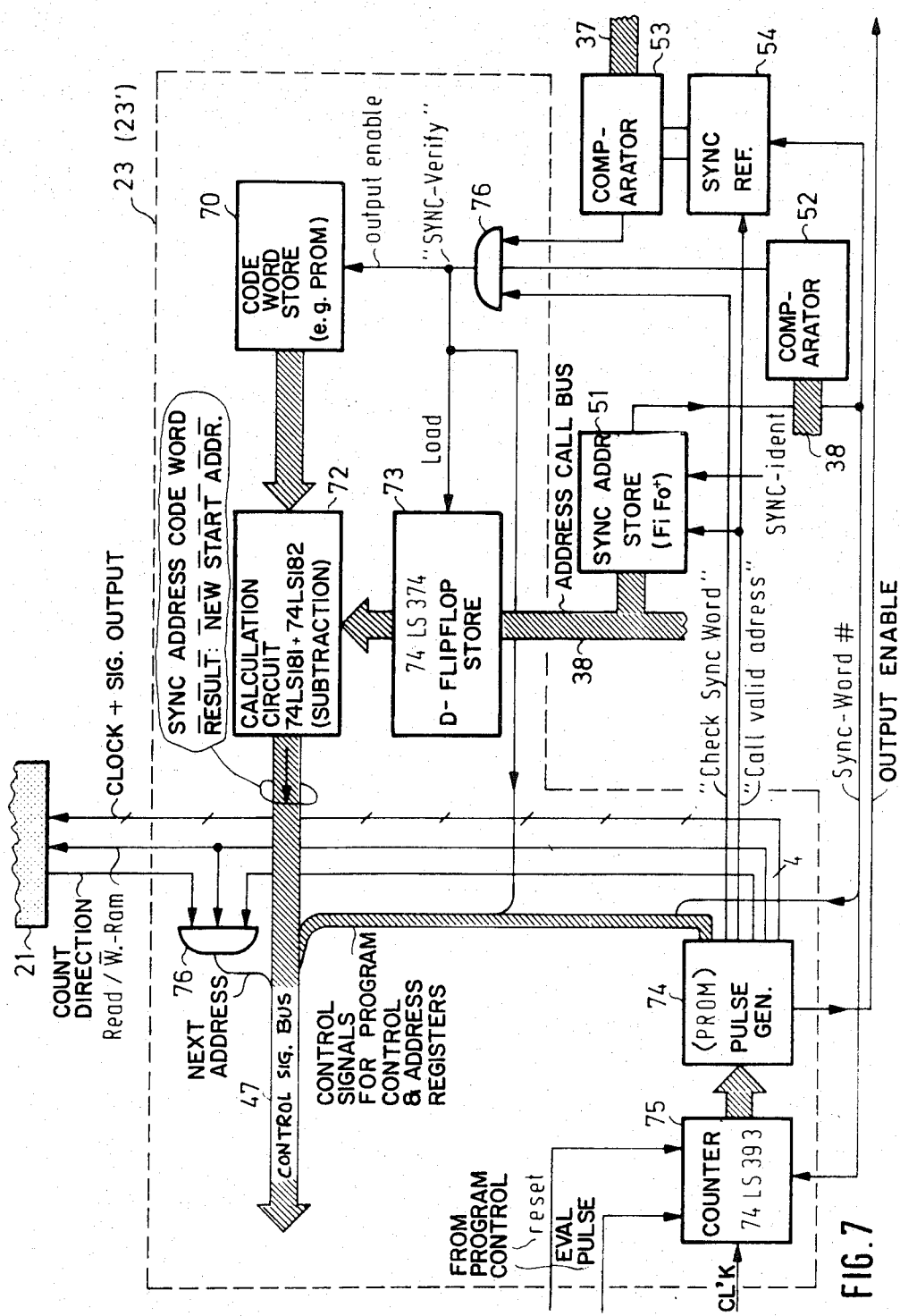
FIG. 7 is a circuit block diagram showing the constitution of the jump-back circuit 23 (23') of FIG. 2 and certain other elements closely associated therewith shown in previous figures.
Figure 9:
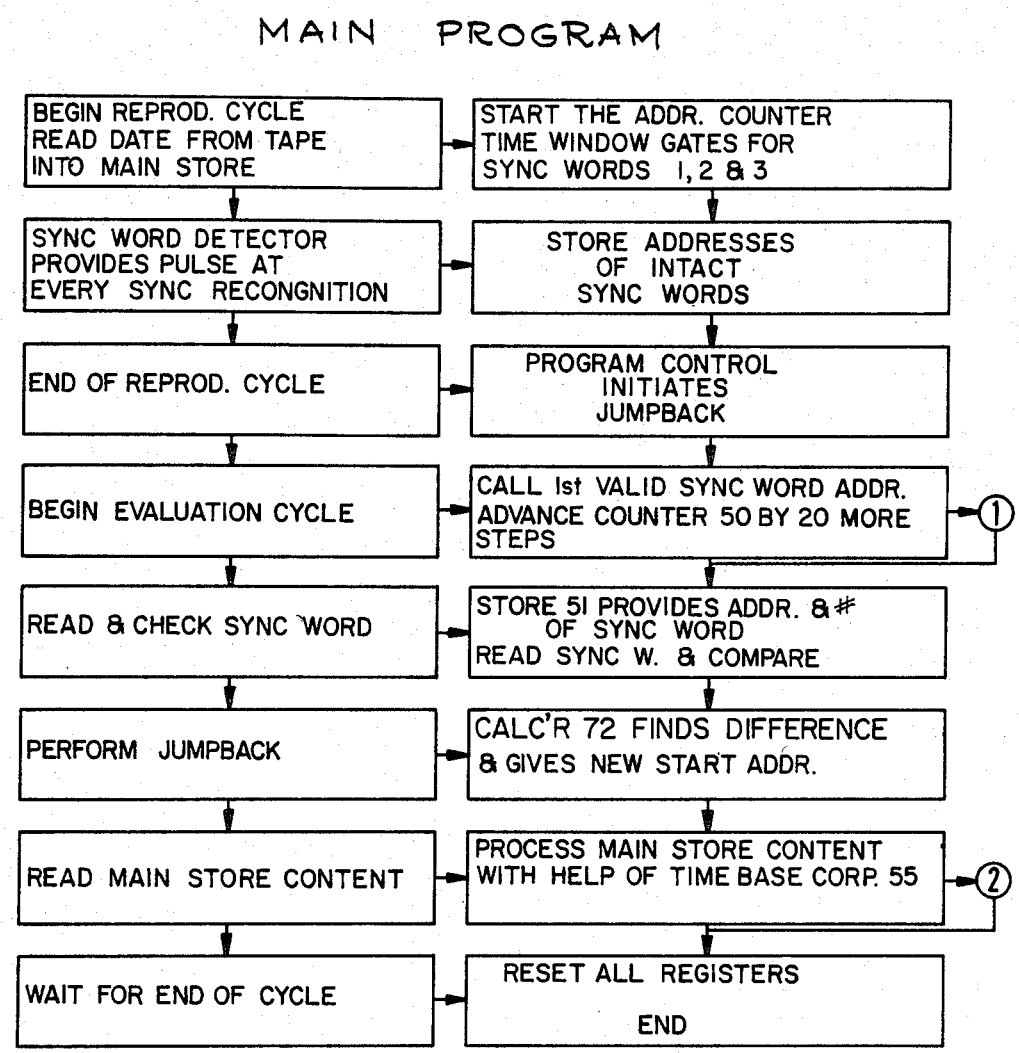
FIG. 9 is a flow diagram of the main or overall program by which the circuit of FIG. 2 operates, and FIGS. 10 and 11 respectively show two sub-routines or sub-programs related to the program of FIG. 9.
Figure 10:
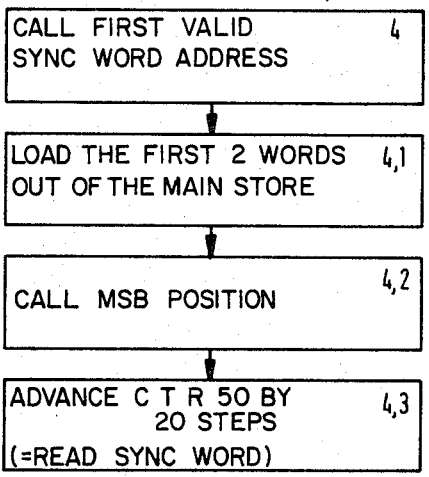
Figure 11:
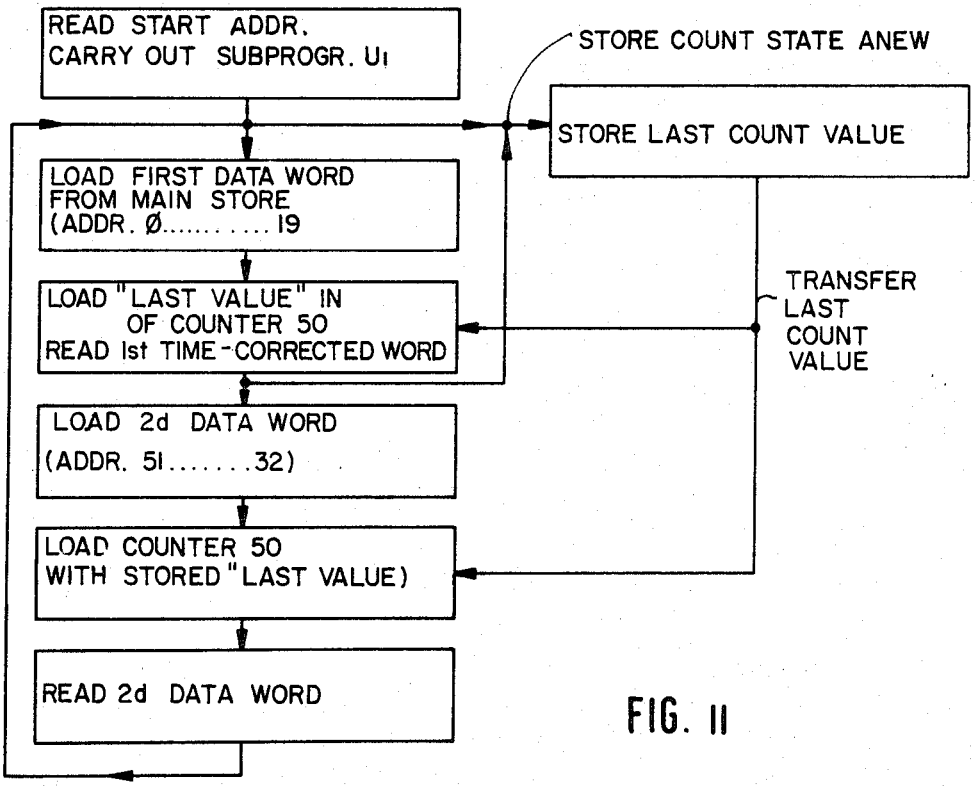

FIG. 7 shows basic internal constitution of the jumpback circuit in a conventional form. The tasks of the circuit 23 can also be performed by a microprocessor equipped with peripheral components. The program shown in FIGS. 9 and 10 and 11 show the program structure for the programming of such a microprocessor for that case.

The jumpback circuit 23 contains the counter 75 which has its outputs connected to a PROM pulse generator 74. The program control circuit 20 supplies the necessary counting and reset pulses to the counter 75. The outputs of the pulse generator 74 control the counting and comparison circuit 21, the sync address store 51 and the sync word reference source 54, and provide report signals to the program control circuit 20 at the end of the jumpback operation and at the end of the processing cycle. With the calling up of the sync word address, information is given to the counter 75 and to the program control circuit 20, which sync word was read. In case no intact sync word exists at all or only the last (third) sync word can be read, the error correction circuits 26 and 27 are turned on with an error announcement signal. The sync address store 51 supplies the stored addresses over the bus 38 to the D-flipflop store 73. The calculation circuit 72 calculates therefrom and from the code word information out of the store 70 the new start address which is transmitted over the bus 47 along with the control signals to the program control circuit 20. The buffer store 80 takes over these addresses and passes then on over the bus 44 to the address registers 16 and 17.

The processing of the main store content now proceeds by the interplay of the counter 75, the pulse generator 74 and the counting and comparison circuit 21. From the evaluation pulse on, the entire address region of the main store is now processed by the counter 75, while the PROM pulse generator controls the writing-in and reading-out of data in the circuits.

It should be explained with reference to FIG. 10 and FIG. 11 how this takes place. In the very first reading cycle, as shown in the subprogram 1 of FIG. 10 schematically, two "data" words (data can also be sync words) are loaded into the counting and comparison circuit 21. Then the stored "MSB" position is called out of the counter 50 (FIG. 3) and the first data word (sync word) is read out. Then the subprogram 2 is carried out often enough to read the entire content of the main store. The alternation of reading out of the main store, the loading of the last count condition (which at the beginning of the cycle is the MSB position), the reading-out of the circuit 21 and the signal output is prescribed by the PROM pulse generator 74 according to a fixed time scheme. The signal output of data words which were recorded on the tape as sync words or code words can be suppressed by a corresponding programing of the PROM 74. This is acheived by the control of the "output enable" signal. If recordable code words are to be read out of the magnetic tape and evaluated, the following modifications of the jumpback circuit 23 are necessary: the PROM 70 is replaced by a RAM-type store. The code word can now be read every time. The content of the PROM store of the pulse generator 74 must therefore be so modified that the jumpback takes place only after the reading of the code word, that means that the sync word and the code word must be evaluated first before the jumpback. The command "sync verify", which according to FIG. 7 activates the Prom 70, will in this case be replaced by another command out of the PROM 74.

Figure 8:
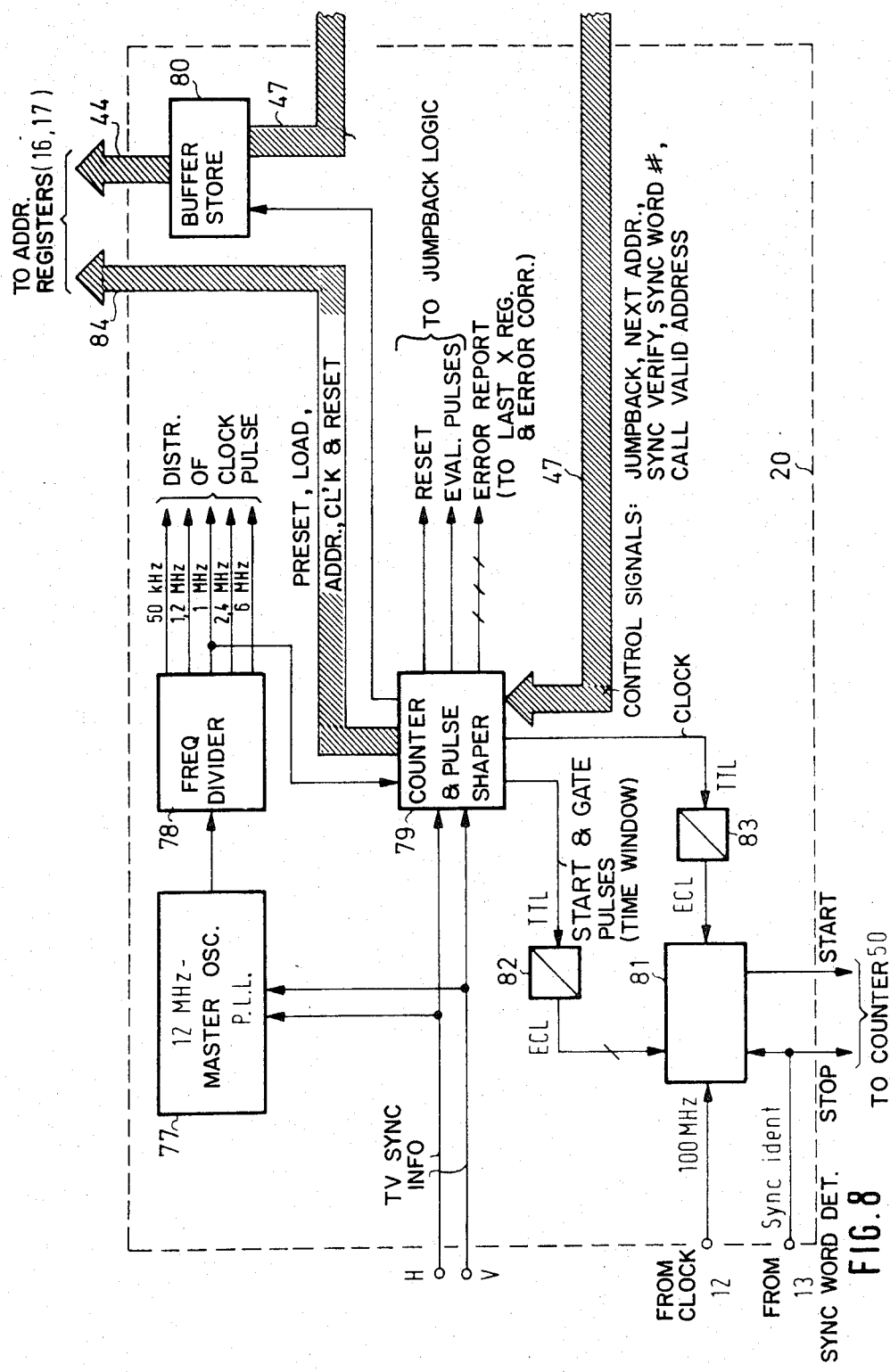
FIG. 8 is the circuit block diagram of the program control circuit 20 of FIG. 2.

The program control circuit 20 (FIG. 8) contains a master oscillator 77 that oscillates at a high frequency, such as for example 12 MHz or 36 MHz. By division with different division ratios in the frequency divider 78, it is possible to obtain the various different frequencies which are necessary for control and for the clock pulse supply of the rest of the circuitry. This is performed by the frequency divider 78. As has been many times described in the technical literature, the master oscillator is synchronized, by a phase-locked-loop circuit, with available television scanning frequency sources. This is not absolutely necessary, but an intercoupling of the synchronizing frequencies provides favorable conditions from the point of view of measurement technology.

The counter and pulse shaper 79 derives from the television synchronizing frequencies H and V of the tape machine the time gate pulses, such as for example the time window 6 (FIG. 1) and the start pulse for the counter 50. These pulses and the clock pulses are supplied over the TTL-ECL level converters 82,83 to a gate circuit 81, which assures that the counter 50 (FIG. 3) is started and stopped with precise timing. Various report signals are provided over the bus 47 from the jumpback circuit 23 to the counter and pulse-shaping circuit 79. With the report "jumpback", the newly calculated start address is taken over from the calculating circuit 72 over the bus 84 into the buffer store 80, and the address registers 16 and 17. During the processing, the command "next address" then has the effect every time that the pulse-shaper 79 advances the address registers 16 and 17. When the end of the address region is reached, the pulse-shaper issues a rest order to the address register and waits until the beginning of the next cycle, which begins with a new start pulse and time window 6.

The expression "multi-bit", used to describe inputs, outputs or connections, signifies bit-parallel inputs, outputs or connections. The term "bus" also refers to bit-parallel connections, but this term is used more commonly where more than two ports are connected, although the term may also be used where only two parts are connected.

Although the invention has been described with reference to particular illustrative examples, it will be recognized that variations and modifications are possible within the inventive concept.

We claim:

1. Method utilizing random-access temporary storage means, a synchronization word reference source and storage address counting and comparison means, all under control of a program control unit, and also a jump back circuit interconnecting said counting and comparison means with said program control unit, of reproducing digitally encoded data signals registered on a storage medium in data segments bracketed between synchronizing words, each having a beginning address, under conditions in which signal dropout intervals occur, wherein word synchronization is maintained for the data segment following a synchronizing word which is garbled or suppressed by a signal dropout or error, by performing the steps of:

storing in said temporary storage means (18, 19), the entire data of data segments bracketed between reproduced synchronizing words, along with the reproduced synchronizing words which thus bracket said information, with at least two segments of said data being stored at the same time;

generating timing window signals for expected synchronizing words;

determining that a synchronizing word has been missed when no synchronizing word has been recognized during the presence of a said timing window signal, re-establishing the original ordered relation of said data information following a missed synchronizing word by calculating back to the beginning address of a missed synchronizing word and by providing correction of data bit position by reference to at least one of the synchronizing words following the end of the data segment that follows said missed synchronizing word.

2. Method according to claim 1 in which there are also performed the steps of temporarily storing each synchronizing word recognized as such and checking it for completeness and correctness.

3. Method according to claim 2 in which there is also performed the step of checking the address position of each synchronizing word for making address corrections.

4. Method according to claim 1 in which all data segments are stored in said temporary storage means and the read-outs from said temporary storage means are timed by quartz-controlled clock pulses, whereby said steps of storing and ordered-relation re-establishing are incorporated in the process of smoothing out digital timing errors.

5. Apparatus for maintaining word synchronization of digitally encoded signals after a synchronizing word is missed in the reproduction of digitally encoded signals recorded in data segments interposed between words of a succession of synchronizing words distinguishable at least from each other comprising:

an input series-to-parallel converter (14);

a level converter (15) and a synchronizing word detector (13) having their inputs connected in parallel to the output of said series-to-parallel converter (14) said level converter having an output connected to a first data bus;

a clock pulse regenerator (12) connected to the input of said input series-to-parallel converter for providing regenerated bit-clock pulses for said series-to-parallel converter (14) and said synchronizing word detector (13);

random access storage means (18, 19) connected to said first data bus (S36) for storing signal sequences produced by said converters (14, 15);

a synchronizing word reference source (45, 54) for supplying a sequence of different synchronizing words in a predetermined cycle to a second input of said synchronizing word detector;

counting and comparison circuit means (21, 22) for counting out and storing addresses of synchronizing words and for comparing the stored addresses with a reference address supplied by said synchronizing word reference source (45, 54), said counting and comparison circuit means being connected to said storage means (18, 19) by said first data bus (36);

jump-back circuit means (23, 23') for control of the sequential order of the synchronizing words supplied by said synchronizing word reference source (45, 54) to said synchronizing word detector (13) and for causing said counting and comparison means to count back through addresses from one synchronizing word beginning address to the next for verification of successive synchronizing words;

address register means (16, 17) and program control means (20), the latter connected for controlling interrogation inputs of said address register means over a control bus (40) timed by pulses provided by said clock pulse regenerator (12);

said address register means having connections to an address bus (38), to which said program control means (20), said random access storage means, said jump-back circuit means (23, 23') and said counting and comparison circuit means (21,22) are connected, said jump-back circuit means (23,23') having multiple connections (46) with said counting and comparison circuit means (21,22), whereby said jump-back circuit means in response to equality of reference and stored addresses verifies at an output thereof the presence of a valid synchronizing word and its position among reproduced signals and also refers said program control means back to the beginning address of the first synchronizing word in said random address storage means, whether or not the word was verified, for reading out the contents of the storage means with proper timing.

6. Apparatus according to claim 5 wherein said counting and comparison circuit means (21) includes a first counter-and-storage means (50) for storing the position of the most significant bit and a storage cell (55), multibit parallel connections (71) being provided between signal outputs of said counter and storage unit and control inputs of said storage cell, said storage cell (55) also having data inputs connected to said first data bus (36) and outputs connected to a second data bus (37);

a first comparison stage (53) having a first input connected to said second data bus (37) and a second input connected with the output of said synchronizing word reference source (54), and its output connected to said jump-back circuit means (23);

sync address storage means (51) connected to said address bus for entry, storage and delivery of synchronizing word addresses;

a second comparison stage (52) having first multibit inputs connected to said address bus and second multibit inputs connected to content outputs of said sync address storage means (51) and having its output connected to said jump-back circuit means (23), said jump-back circuit means (23) having outputs connected to said synchronizing word reference source (54) and to a read/write control input of said sync address storage means (51) for calling out a valid address and being connected to said storage cell (55) for control thereof.

7. Apparatus according to claim 6 wherein said jump-back circuit means (23) includes:

code word storage means (70) and calculating means (72), said code word storage means having a multibit output connection to a multibit input of said calculating means, said code word storage means and calculating means being constituted for calculating the start address of a missed synchronizing word in response to addresses provided by said sync address storage means (51) through said address bus (38);

a control bus (47) connected to the output of said calculating means (72) for supplying calculated addresses of a missed synchronizing word to said program control means (20);

a programmable read-only memory (74) constituted as a pulse source and connected for control of said counting and comparison circuit means (21), said sync address storage means (51) and said synchronizing word reference source (54);

a fourth counter (75) having a count output for controlling said programmable read-only memory (74), said fourth counter having, in addition to timing and sync word number inputs resepctively connected to said clock pulse regenerator (12) and to said address bus (38), also reset and control inputs connected to said program control means (20) for provision of reset and evaluation pulses respectively.

8. Apparatus according to claim 9 wherein said program control means (20) comprises:

a master oscillator (77) connected for synchronization by television signal information (H, V);

frequency division means (78) having an input connected to the output of said master oscillator (77) and outputs respectively providing timing control pulses at various intervals longer than the period of said master oscillator and longer than the period of the output of said clock pulse generator (12);

counting and pulse shaping means (79) for providing reset and evaluation pulses to said jump-back circuit means (23, 23') in response to said synchronizing information (H,V) of said television signals and for providing start, clock and gate pulses for ultimate control of said first counting-and-storage means (50);

a gate circuit (81) for control of starting of said first counting and storage means (50);

TTL to ECL converter means (82,82) for converting start, clock and gate pulses provided at the output of said counting and pulse-shaping means (79) into corresponding ECL signals for control of said gate circuit (18), said gate circuit also having inputs connected to the output of said clock pulse regenerator (12) and said synchronizing word detector (13), the latter also being connected to control stopping of said gate circuit and said first counting-and-storage means (50), and buffer storage means (79) and having inputs connected to said control signal bus (47), said address register means (16,17) being connected to multibit outputs of said counter and pulse shaper (79) and of said buffer storage means (80).

9. Apparatus according to claim 6, wherein said storage cell (55) contains at its data input a parallel-to-series converter (61) for converting signals on said first data bus (36) to serial form and further comprises:

second random access storage means (62) having a serial data input connected to the output of said parallel-to-series converter (61);

a second serial-to-parallel converter (63) having its input connected to the serial data output of said second random access storage means (62) and its output connected to said second data bus (37);

second counter and storage means (59) having a multibit input connected to the output of said first counter-and-storage means (50) and having a multibit output for supplying addresses to control inputs of said random access storage means (62) in response to information regarding the content of said first counter-and-storage means relating to most significant bit position.

10. Apparatus according to claim 6 wherein said storage cell (55) has at its input two parallel-to-series converters (66,66') and a demultiplexer (67) for selectively passing on the serial output of one or the other of said parallel-to-series converters;

a shift register (68) having its input connected to the output of said demultiplexer (67) and having parallel outputs connected to said second data bus (37);

a third counter (69) having loading inputs connected to content outputs of said first counter-and-storage means (50) through said multiple connections (46) for transfer of most significant bit position information relating to a synchronization word;

said parallel-to-series converters, multiplexer, shift register and counter being connected for clocking by said jump-back circuit means (23') and said shift register having an output-enable connection connected to said jump-back circuit means (23') for control of output.

* * * * *